(12) United States Patent
Hao et al.

(10) Patent No.: US 9,087,143 B2
(45) Date of Patent: Jul. 21, 2015

(54) OVERLAYING TRANSPARENCY IMAGES INCLUDING PIXELS CORRESPONDING TO DIFFERENT HEIRARCHICAL LEVELS OVER A GEOGRAPHIC MAP

(75) Inventors: Ming C. Hao, Palo Alto, CA (US);
Halldór Janetzko, Constance (DE);
Umeshwar Dayal, Saratoga, CA (US);
Meichun Hsu, Los Altos Hills, CA (US);
Daniel Keim, Steisslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 13/435,597

(22) Filed: Mar. 30, 2012

(65) Prior Publication Data

US 2013/0257903 A1    Oct. 3, 2013

(51) Int. Cl.
*G09G 5/00*    (2006.01)
*G06F 17/30*    (2006.01)

(52) U.S. Cl.
CPC .............................. *G06F 17/30994* (2013.01)

(58) Field of Classification Search
None
See application file for complete search history.

(56) References Cited

U.S. PATENT DOCUMENTS

| | | |
|---|---|---|
| 3,487,308 A | 12/1969 | Johnson |
| 5,581,797 A | 12/1996 | Baker |
| 5,608,904 A | 3/1997 | Chaudhuri et al. |
| 5,623,590 A | 4/1997 | Becker et al. |
| 5,623,598 A | 4/1997 | Voigt et al. |
| 5,634,133 A | 5/1997 | Kelley |
| 5,659,768 A | 8/1997 | Forbes et al. |
| 5,694,591 A | 12/1997 | Du et al. |
| 5,757,356 A | 5/1998 | Takasaki et al. |
| 5,801,688 A | 9/1998 | Mead et al. |
| 5,878,206 A | 3/1999 | Chen et al. |
| 5,903,891 A | 5/1999 | Chen et al. |
| 5,924,103 A | 7/1999 | Ahmed et al. |
| 5,929,863 A | 7/1999 | Tabei et al. |
| 5,940,839 A | 8/1999 | Chen et al. |
| 5,986,673 A | 11/1999 | Martz |
| 5,999,193 A | 12/1999 | Conley, Jr. et al. |

(Continued)

FOREIGN PATENT DOCUMENTS

EP    0778001    11/1996

OTHER PUBLICATIONS

Deun et al., Multidimensional Scaling, Open and Distance Learning, Jan. 12, 2000 (pp. 1-16).

(Continued)

*Primary Examiner* — Stephen R Koziol
*Assistant Examiner* — Khoa Vu
(74) *Attorney, Agent, or Firm* — Trop, Pruner & Hu, P.C.

(57) ABSTRACT

Data records contain corresponding values of an attribute and are associated with location information. Hierarchical levels of transparency images are generated, where each of the transparency images includes corresponding pixels that represent the respective data records, and where the transparency images at different ones of the hierarchical levels correspond to different zoom levels of a geographic map. At least one of the transparency images at a dynamically-selected one of the hierarchical levels is overlaid over the geographic map according to which of the zoom levels is selected by a user in zooming of the geographic map, where the at least one transparency image is automatically selected without user input.

15 Claims, 7 Drawing Sheets

(56) References Cited

U.S. PATENT DOCUMENTS

| | | | |
|---|---|---|---|
| 6,052,890 | A | 4/2000 | Malagrino, Jr. et al. |
| 6,144,379 | A | 11/2000 | Bertram et al. |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abrari et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,542,882 | B2 | 6/2009 | Agrawala |
| 7,567,250 | B2 | 7/2009 | Hao et al. |
| 7,714,876 | B1 | 5/2010 | Hao |
| 7,924,283 | B1 | 4/2011 | Hao |
| 8,005,613 | B2 | 8/2011 | Rasmussen |
| 8,078,641 | B2 | 12/2011 | Mao |
| 8,151,194 | B1 | 4/2012 | Chan et al. |
| 2002/0118193 | A1 | 8/2002 | Halstead, Jr. |
| 2003/0065546 | A1 | 4/2003 | Gorur et al. |
| 2003/0071815 | A1 | 4/2003 | Hao et al. |
| 2003/0128212 | A1 | 7/2003 | Pitkow |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0133471 | A1* | 7/2004 | Pisaris-Henderson et al. .. 705/14 |
| 2004/0201588 | A1 | 10/2004 | Meanor |
| 2004/0210540 | A1 | 10/2004 | Israel et al. |
| 2005/0066026 | A1 | 3/2005 | Chen et al. |
| 2005/0119932 | A1 | 6/2005 | Hao |
| 2005/0219262 | A1 | 10/2005 | Hao et al. |
| 2006/0095858 | A1 | 5/2006 | Hao et al. |
| 2007/0225986 | A1 | 9/2007 | Bowe, Jr. et al. |
| 2008/0010273 | A1* | 1/2008 | Frank ................................ 707/5 |
| 2008/0059452 | A1 | 3/2008 | Frank |
| 2008/0065685 | A1* | 3/2008 | Frank ............................ 707/102 |
| 2009/0033664 | A1 | 2/2009 | Hao et al. |
| 2009/0079766 | A1 | 3/2009 | Dolph et al. |
| 2010/0194784 | A1* | 8/2010 | Hoff et al. ..................... 345/661 |
| 2010/0318291 | A1 | 12/2010 | Gluck |
| 2011/0012773 | A1 | 1/2011 | Cunning et al. |
| 2011/0055290 | A1* | 3/2011 | Li et al. ......................... 707/807 |
| 2011/0191014 | A1 | 8/2011 | Feng |
| 2011/0285749 | A1* | 11/2011 | Nielsen et al. ................ 345/629 |
| 2012/0005045 | A1 | 1/2012 | Baker |
| 2012/0150972 | A1 | 6/2012 | Morris et al. |
| 2013/0194272 | A1 | 8/2013 | Hao et al. |

OTHER PUBLICATIONS http://www.pavis.orgiessay/multidimensional_scaling.html, 2001 Wojciech Basalaj, (pp. 1-30).

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18 (2004.

P. Buono et al., "Technical Research Report, Interactive Pattern Search in Time Series," Institute for Systems Research, TR 2005-57, pp. 1-11 (2004.

J. Yang et al., "Visual Hierarchical Dimension Reduction for Exploration of High Dimensional Datasets," Joint Eurographics/IEEE TCVG Symposium on Visualization, pp. 19-28 (May 2003).

J. Fekete et al., "Interactive Information Visualization of a Million Items," Information Visualization, 2002, INFOVIS 2002, IEEE Symposium, Published Oct. 2002, pp. 1-8.

Hao et al., U.S. Appl. No. 13/363,602 entitled Placing Pixels According to Attribute Values in Positions in a Graphical Visualization That Correspond to Geographic Locations filed Feb. 1, 2012 (25 pages).

* cited by examiner

OVERLAYING TRANSPARENCY IMAGES INCLUDING PIXELS CORRESPONDING TO DIFFERENT HEIRARCHICAL LEVELS OVER A GEOGRAPHIC MAP

BACKGROUND

An enterprise can receive various types of information, including as examples customer feedback, sales information, system performance measurements, and so forth. Customer reviews can be submitted online at third-party sites (e.g. web survey sites or social networking sites such as FACEBOOK®, and TWITTER®), or alternatively, reviews can be received directly by an enterprise. Other types of information can be received from other sources. There can be potentially a relatively large number of data records containing various types of information, which can make meaningful analysis of such information difficult and time-consuming.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

An enterprise (e.g. a company, educational organization, government agency, individual, etc.) may collect various types of information from various sources. As examples, such information can include feedback from customers (or more generally "users") to better understand user sentiment regarding an offering of the enterprise. An offering can include a product or a service provided by the enterprise. A "sentiment" refers to an attitude, opinion, or judgment of a human with respect to the offering. An opinion or other sentiment can be mapped to an attribute (such as an attribute associated with an offering or any attribute about which is a sentiment can be expressed) to indicate a degree of satisfaction or other sentiment.

User feedback can be collected from various sources, such as online websites of the enterprise or third-party sites such as travel review websites, product review websites, social networking sites (such as FACEBOOK® and TWITTER®), web survey sites and so forth.

Other types of information that can be collected by an enterprise include measurements from various monitoring devices in a system, such as a network of electronic devices, a data center, a system of storage devices, and so forth. The collected measurements can include performance measurements, such as utilization of computer servers, utilization of storage devices, data rates through communication devices, and so forth. In other examples, collected information can include financial data (e.g. revenue, profit, sales, etc.) of the enterprise, and so forth.

Visualizing relatively large volumes of data records (containing collected information) can be complex and time-consuming. A "data record" refers to a unit of data that contains collected information. For example, the data record can include a user review submitted by a particular user. Also, the data record can include a time attribute (specifying a time at which the data record was submitted or received), a location attribute (identifying a location of the data record), a sentiment attribute indicating a sentiment associated with a user review, and/or other attributes.

Traditionally, visualizations of one or multiple attributes contained in data records do not effectively express geo-spatial information, which is information indicating geographical locations associated with the data records. Without the geo-spatial information, analysis of information contained in the data records (such as sentiments expressed by users or other types of information) may not consider effects of geographic locations with respect to the collected information.

In accordance with some implementations, transparency images containing pixels representing corresponding data records can be overlaid over a geographic map, for indicating geographic locations associated with various data records represented by the pixels. A geographic map refers to a graphical representation of the earth's surface or a portion of the earth's surface. A "transparency image" refers to an image that can be overlaid over another image (that contains the geographic map) such that both the content (pixels) of the transparency image as well as the geographic map is visible to a user. The location information in the location attribute that is associated with the data records allows for appropriate positioning of the pixels relative to the geographic map—in other words, the pixels are positioned in a graphical visualization based on the location information associated with the data records.

A geographic map can be displayed at different zoom levels, corresponding to different user selections. To accommodate the ability to view a geographic map at different zoom levels, the transparency images that can be overlaid over the geographic map can include transparency images at multiple hierarchical levels that correspond to the zoom levels. The transparency images at the different hierarchical levels can be created by recursively dividing a data space containing data records into progressively smaller partitions, where each smaller partition contains a respective subset of the data records in the data space. Depending upon the selected zoom level of the geographic map, the transparency image(s) at the corresponding one of the hierarchical levels is (are) selected for overlaying the geographic map. In this manner, the amount of pixels representing corresponding data records that are displayed is based on the zoom level of the geographic map.

Figure 1:
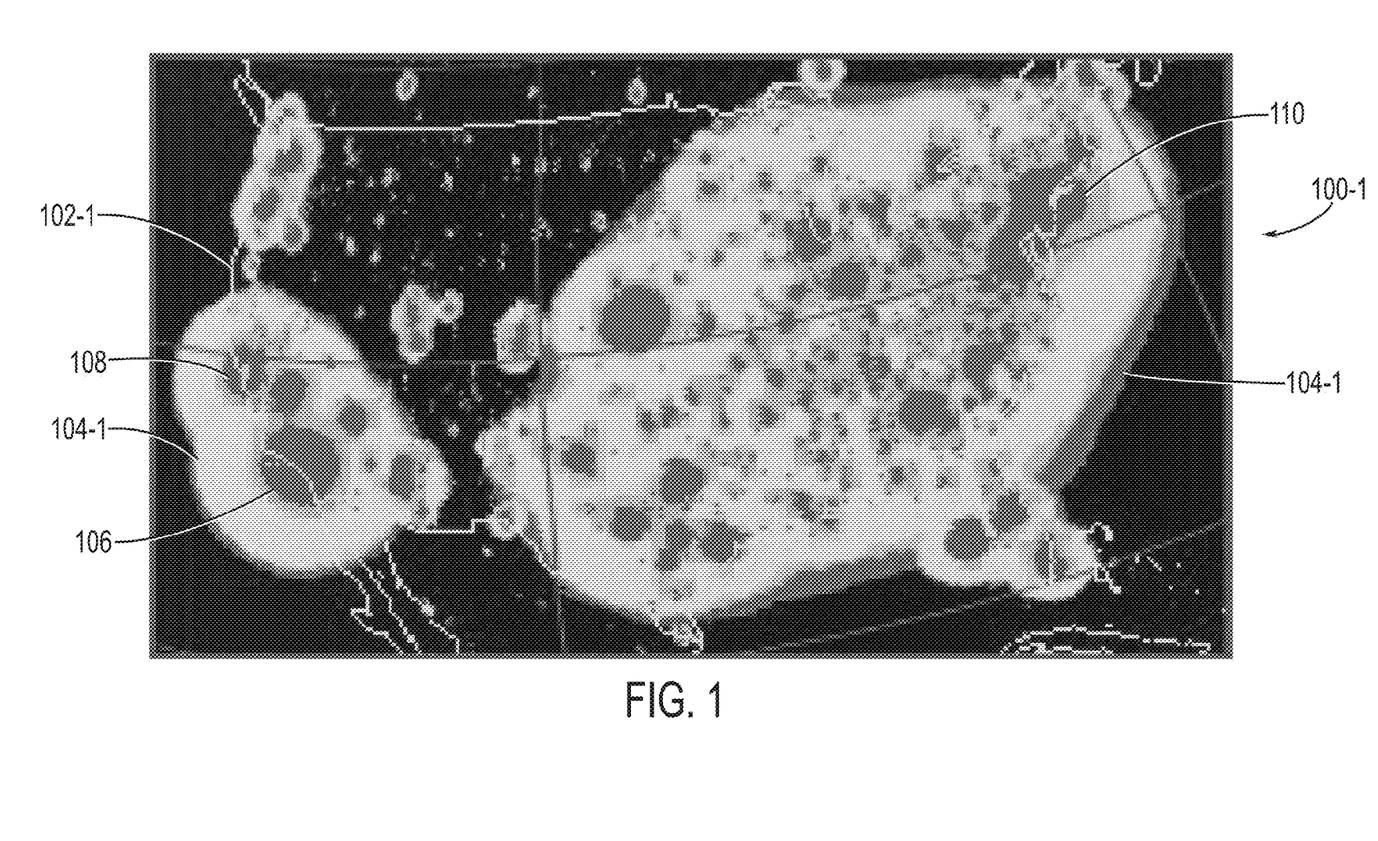
FIGS. 1-4 are graphical visualizations depicting geographic maps at different zoom levels along with corresponding transparency images containing pixels that represent data records, in accordance with some implementations.

FIG. 1 illustrates a graphical visualization 100-1 that includes an image 102-1 containing a geographic map and a transparency image 104-1 that contains pixels representing corresponding data records. The transparency image 104-1 is overlaid over the geographic map image 102-1. Pixels are assigned various different colors based on corresponding values of an attribute contained in the corresponding data records. As an example, pixels can be assigned different colors based on values of a sentiment attribute contained in the corresponding data records. In such examples, green colors can be used for indicating positive sentiment expressed by users, whereas red colors can be used to represent negative sentiments of users. A gray color can be used to represent a neutral sentiment. A darker green color indicates a more positive sentiment than a lighter green color, whereas a darker red color indicates a more negative sentiment than a lighter red color.

Instead of using different colors to represent different sentiments, other types of visual indicators can be used instead, such as different fill patterns or different gray levels assigned to the pixels. More generally, different visual indicators of pixels can be used for representing different values of an attribute contained in data records.

The geographic map image 102-1 includes yellow boundaries to indicate the borders of the different countries in the view of FIG. 1. As can be seen in FIG. 1, the transparency image 104-1 contains various clusters of pixels. Higher densities of pixels are located at geographic locations corresponding to larger cities, while lower densities of pixels are associated with geographic locations where the human population is more sparse.

Due to the uneven distribution of data records at different geographic locations, techniques or mechanisms according to some implementations provide for placement of pixels representing data records that avoids or reduces the likelihood of overlapping of pixels that represent different data records. For example, in a city such as Los Angeles, which can be associated with a relatively large number of data records, a relatively large number of pixels representing the data records can share the same geometric coordinates (such as geometric coordinates associated with the city of Los Angeles). Instead of placing the pixels associated with the same geometric coordinates at the same position, the pixels can be placed in nearby positions within a defined region. By placing pixels sharing the same geometric coordinates in nearby positions, clusters of such pixels are formed, such as clusters 106, 108, 110, and so forth shown in FIG. 1.

If pixels corresponding to data records that share the same geometric coordinates were placed at the same position in a graphical visualization, then the graphical visualization would indicate the presence of just one data record at that position, even though potentially there can be hundreds or thousands of data records sharing the same geometric coordinates. By using placement techniques according to some implementations, occlusion of data records in the graphical visualization can be avoided or reduced.

Figure 2:
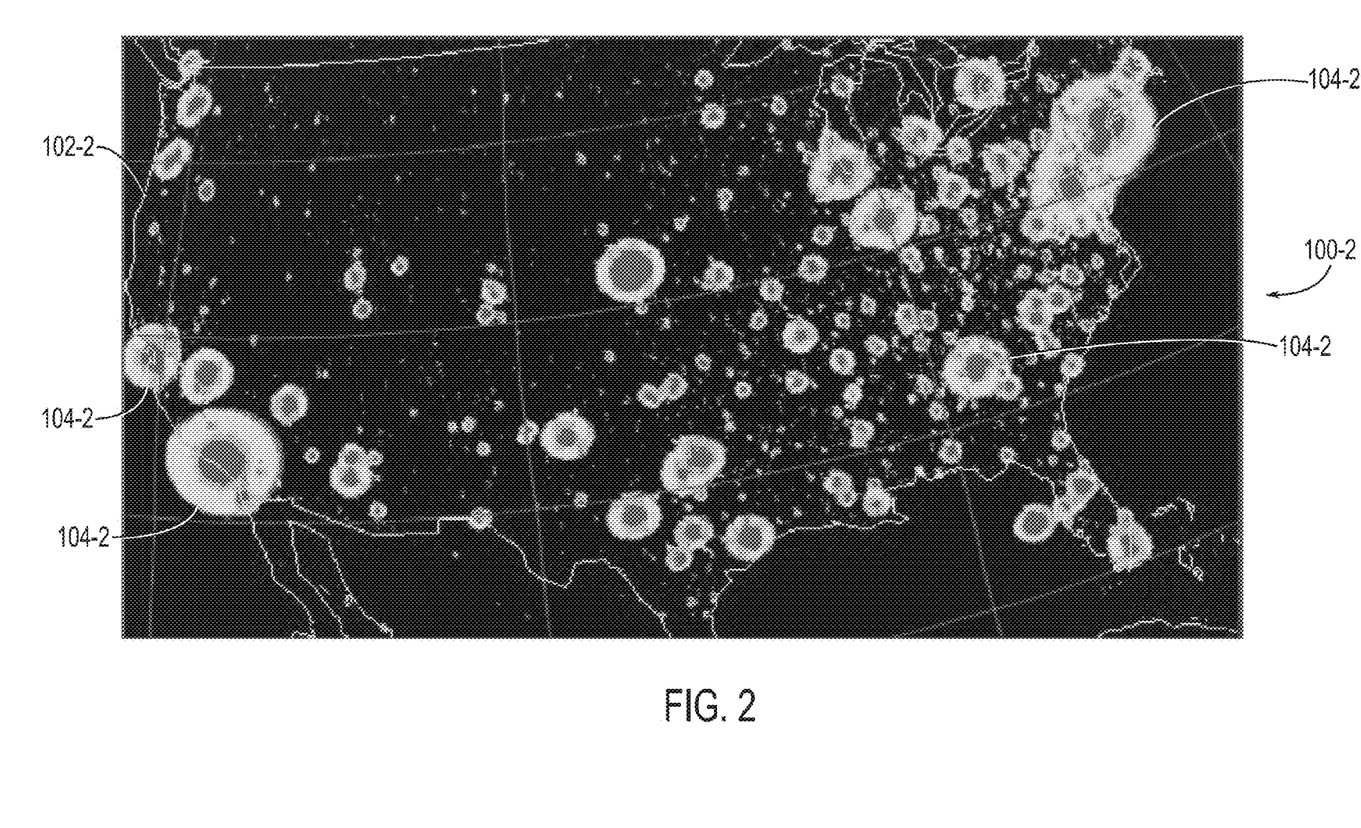

FIG. 1 shows the geographic map at a first zoom level. FIG. 2 illustrates a graphical visualization 100-2 in which the geographic map (in an image 102-2) is shown at a second deeper zoom level that corresponds to a more zoomed-in view of the geographic map. The transparency image 104-1 depicted in FIG. 1 is at a first hierarchical level. For FIG. 2, in response to selection of the second zoom level for the geographic map, transparency images 104-2 at a second hierarchical level are selected for display over the geographic map image 102-2.

The transparency images 104-2 depicted in FIG. 2 contain pixels in partitions that have been partitioned from a partition corresponding to the transparency image 104-1 of FIG. 1. In the foregoing example, it is assumed that there is just one transparency image 104-1 for the hierarchical level depicted in FIG. 1. In different examples, there can be multiple transparency images associated with the view of FIG. 1.

Figure 3:
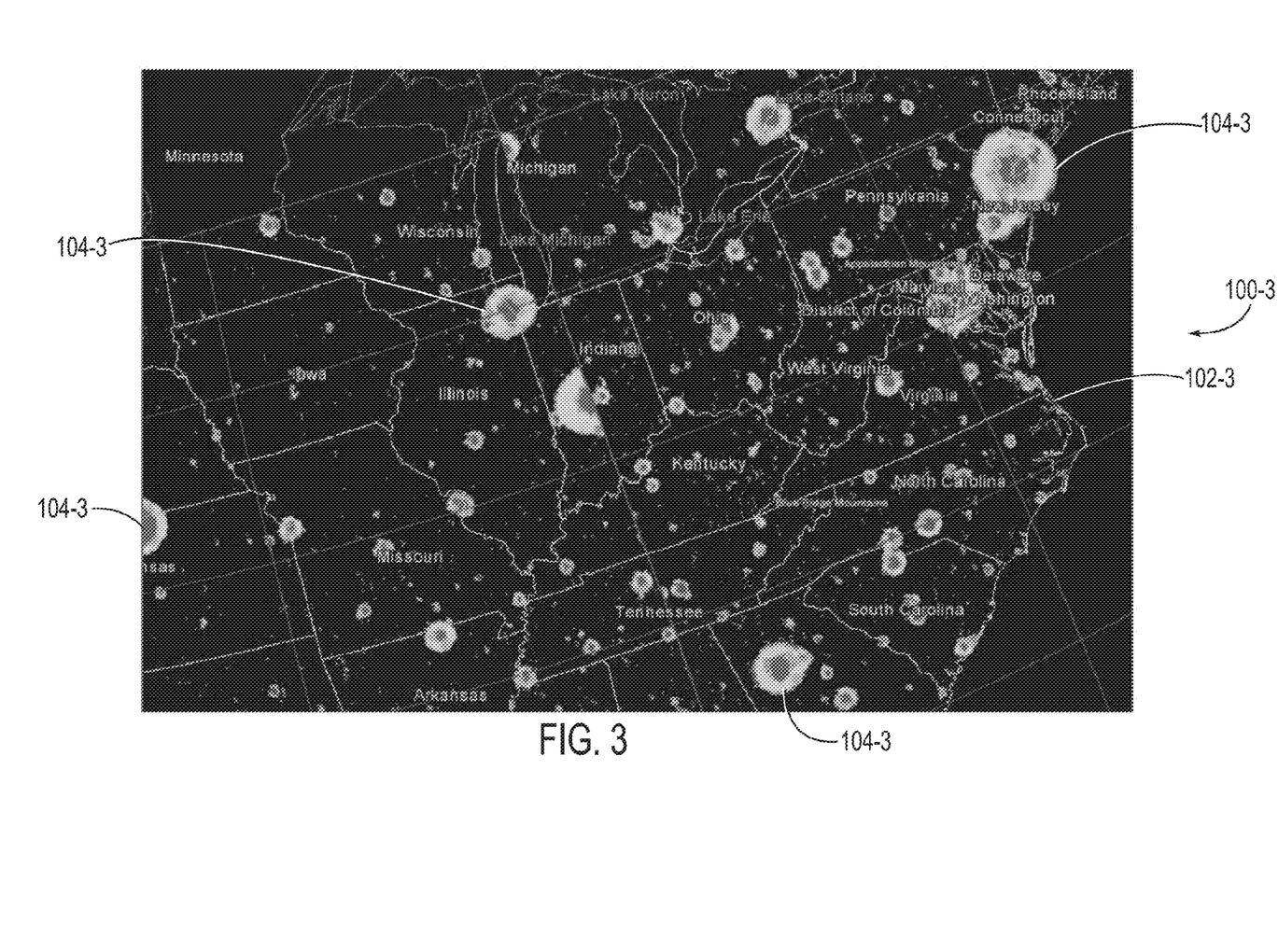

FIG. 3 shows yet another zoom level of the geographic map, which is further zoomed in from the view of FIG. 2. A graphical visualization 100-3 of FIG. 3 includes an image 102-3 of the geographic map at a deeper zoom level than that of FIG. 2. The deeper zoom level of FIG. 3 allows state names (e.g. Michigan, Missouri, Arkansas, Pennsylvania, etc.) to be visible. In response to the selection of the different zoom level for the geographic map depicted in FIG. 3, transparency image(s) 104-3 at a different hierarchical level (different from the hierarchical levels of the transparency images 104-1 and 104-2 of FIGS. 1 and 2) are selected to overlay the zoomed-in geographic map image 102-3 of FIG. 3.

Figure 4:
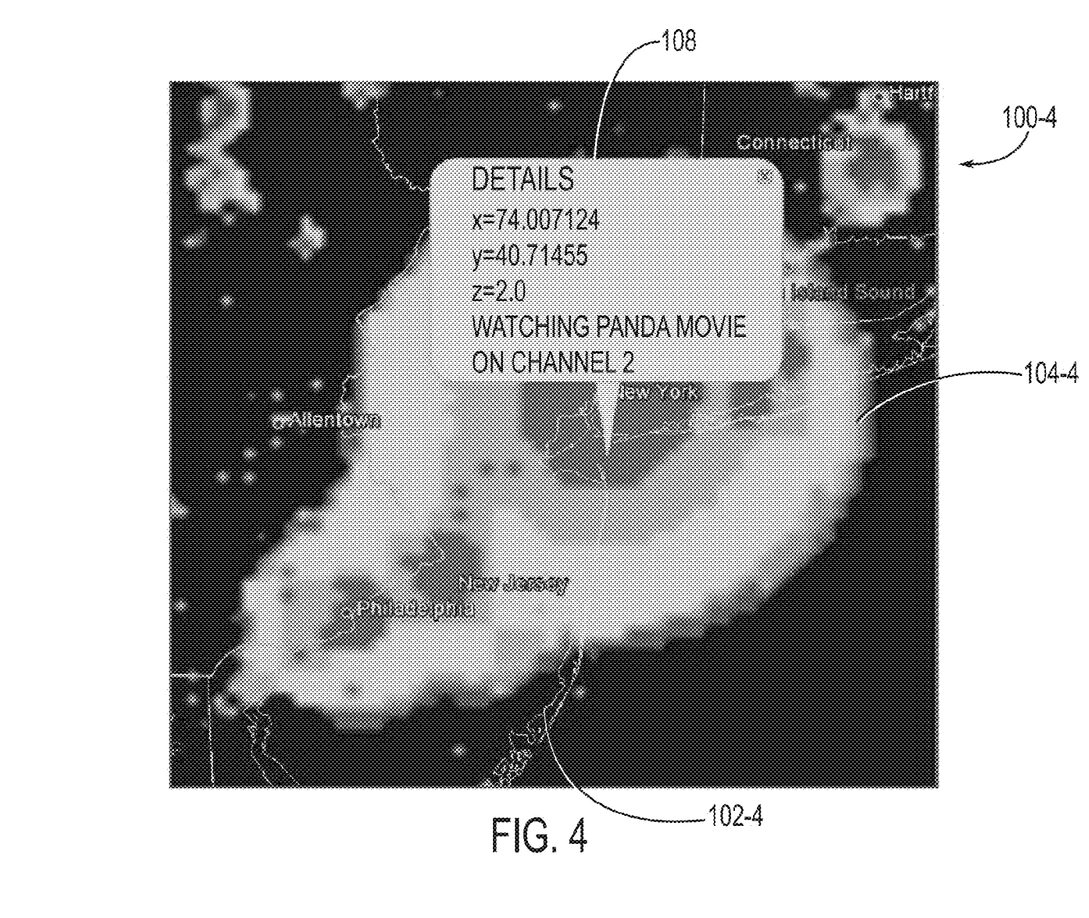

FIG. 4 shows yet another graphical visualization 100-4 that shows an image 102-4 of the geographic map at a further, deeper zoom level than the zoom level of FIG. 3. This deeper zoom level allows city names to be visible in the geographic map image 102-4. A transparency image (or transparency images) 104-4 depicted in FIG. 4 is (are) at yet another hierarchical level that is different from the hierarchical level of the transparency image(s) 104-3 of FIG. 3.

Also, in FIG. 4, a pop-up box 108 is depicted, which is displayed in response to a user selection of a particular pixel in the transparency image(s) 104-4 of FIG. 4. The pop-up box 108 contains additional detailed information of the data record represented by the selected pixel. Selection of the pixel can be in response to a user (using an input device) moving a cursor over the pixel. Alternatively, the pixel selection can be based on a user double-clicking over the pixel. In the pop-up box 108, the "x" and "y" attributes represent longitude and latitude coordinates, and the "z" attribute represents other information. Also, a comment from a user ("Watching Panda Movie on Channel 2" can be displayed in the pop-up box 108.

Figure 5:
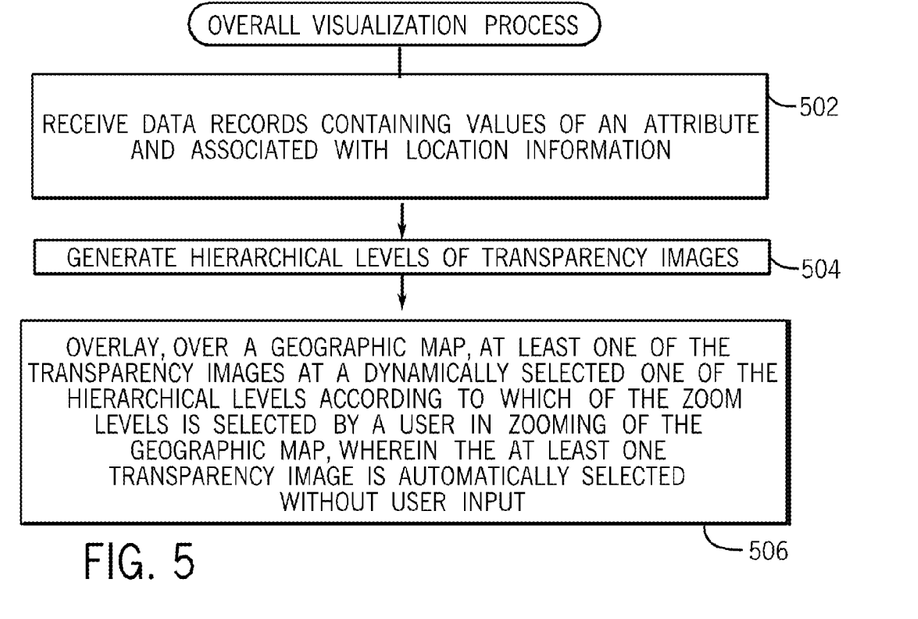
FIGS. 5 and 6 are flow diagrams of visualization processes according to some implementations.

FIG. 5 is a flow diagram of a visualization process according to some implementations. The process receives (at 502) data records containing corresponding values of an attribute. In an example, the attribute can be a sentiment attribute. In other examples, the attribute can be another type of attribute, such as a measurement attribute or a financial attribute. The received data records are also associated with location information (which can be contained in a location attribute of the received data records). The process generates (at 504) hierarchical levels of transparency images, where each of the transparency images includes corresponding pixels that represent the respective data records. The transparency images at different ones of the hierarchical levels correspond to different zoom levels of a geographic map. The pixels representing the data records are positioned according to the associated location information of the data records.

The process overlays (at 506) at least one of the transparency images at a dynamically selected one of the hierarchical levels according to which of the zoom levels is selected by a user in zooming (varying the zoom) of the geographic map, where the at least one transparency image is automatically selected without user input or awareness. When a user changes the zoom level of the geographic map, then transparency image(s) at a different one of the hierarchical levels is (are) selected dynamically for overlaying over the zoomed portion of the geographic map. Dynamic selection of a hierarchical level can refer to selection of the hierarchical level on the fly (or on a real-time basis) in response to user selections of zoom levels for the geographic map.

Figure 6:
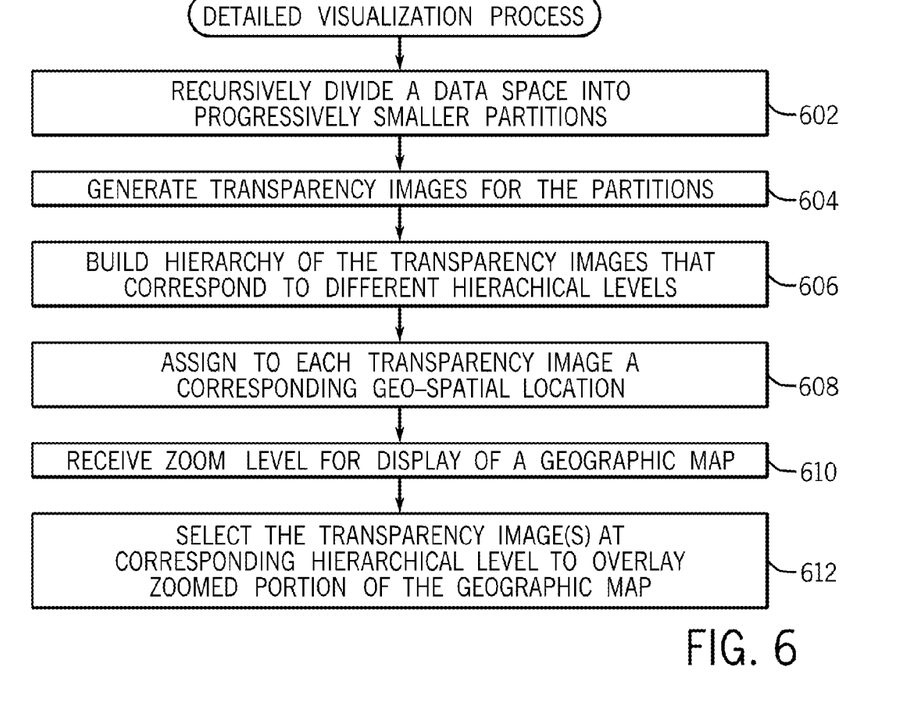
Figure 7:
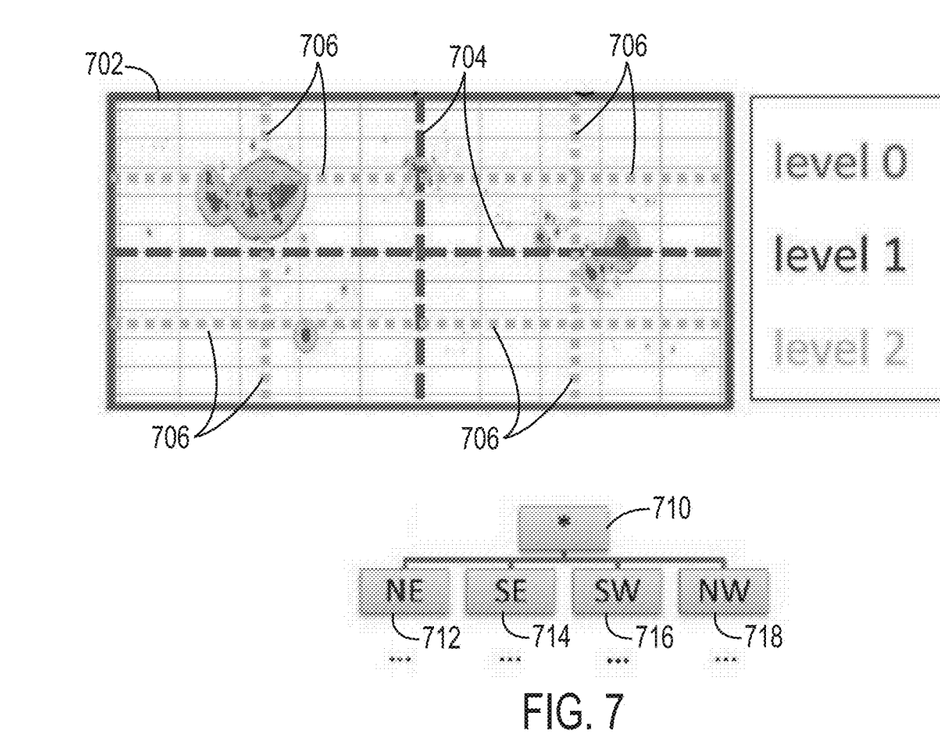
FIG. 7 illustrates division of a data space containing data records into multiple partitions corresponding to different hierarchical levels in accordance with some implementations.

Reference is made to FIGS. 6 and 7 in the following discussion. FIG. 6 is a flow diagram of a more detailed visualization process according to further implementations. The process recursively divides (at 602) a data space containing data records into progressively smaller partitions that correspond to different hierarchical levels. Transparency images are then generated (at 604) for the respective partitions.

The original data space is the largest partition (at hierarchical level 0). In FIG. 7, this largest partition at hierarchical level 0 is represented by the red boundary 702. The partition represented by boundary 702 can be divided into four partitions at hierarchical level 1, as indicated by the blue dashed lines 704. Each of the partitions at hierarchical level 1 can in turn be divided into partitions at hierarchical level 2, as indicated by the yellow dashed lines 706. The transparency image for the partition at hierarchical level 0 has a size corresponding to boundary 702. Four transparency images are generated for the four partitions at hierarchical level 1, with each transparency image at hierarchical level 1 having to size defined by a rectangle corresponding to the blue boundary 704. There are 16 transparency images for the partitions at hierarchical level 2, with each transparency image at hierarchical level 2 having a size defined by a rectangle corresponding to the yellow boundary 706.

As further shown in FIG. 7, the division of a partition 710 is a division into a northeast (NE) quadrant 712, a southeast (SE) quadrant 714, a southwest (SW) quadrant 716, and a northwest (NW) quadrant 718.

The process of FIG. 6 then builds (at 606) a hierarchy (similar to a QuadTree hierarchy) of the transparency images that correspond to different hierarchical levels. The process then assigns (at 608) to each transparency image a corresponding geo-spatial location (e.g. a location defined by a pair of longitude and latitude coordinates). The geo-spatial locations of the transparency images can then be used to place these transparency images into zoomed portions of a geographic map. Stated differently, the geo-spatial locations of the transparency images can be used to synchronize selected ones of the transparency images with a displayed portion of the geographic map. Depending on what zoomed portion of the geographic map is visible, note that a subset of the transparency images at a particular hierarchical level may be displayed.

The process receives (at 610) a zoom level for display of a geographic map. The process then selects (at 612) the transparency image(s) to overlay over the zoomed portion of the geographic map.

A pseudocode according to some examples of generating the transparency images is depicted below.

```
1    //Exports all subtiles until maxLevel is reached
2    //(a maxLevel of 3 for instance will result in altogether 63 tiles)
3    for (int level = 0    level   <maxLevel; level++)       {
4        double tileWidth = Math.pow(2,-level);
5        int nrTiles = (int) Math.pow(2, level);
6        for (int tileCounterX = 0; tileCounterX < nrTiles;
             tileCounterX++)  {
7            for (int tileCounterY = 0; tileCounterY < nrTiles;
                 tileCounterY++) {
8            //the method below will invoke the pixel visualization for the
9            //given part of the data set. The data set is defined by
10           //numbers in the interval [0,1] representing the minimum
11           //and maximum value in each dimension.
12           exportOfGivenTile (tileCounterX * tileWidth,
13               (tileCounterX + 1) * tileWidth,
14               tileCounterY * tileWidth,
15               (tileCounterY + 1) * tileWidth);
16                 }
17       }
18    }
```

The pseudocode above exports "subtiles," which correspond to the transparency images described above. The parameter "maxLevel" indicates the number of hierarchical levels for which transparency images are to be created. Line 3 of the pseudocode specifies that the different levels are iteratively processed, starting at level 0 and proceeding to maxLevel. Line 4 of the pseudocode defines the width (tileWidth) of each subtile at the current level, and line 5 of the pseudocode specifies the number of subtiles at the current level.

For each of the subtiles at the current level, the pixels from the respective portion of the data set are exported for inclusion in the respective subtile (transparency image) at lines 6-15 of the pseudocode.

Figure 8:
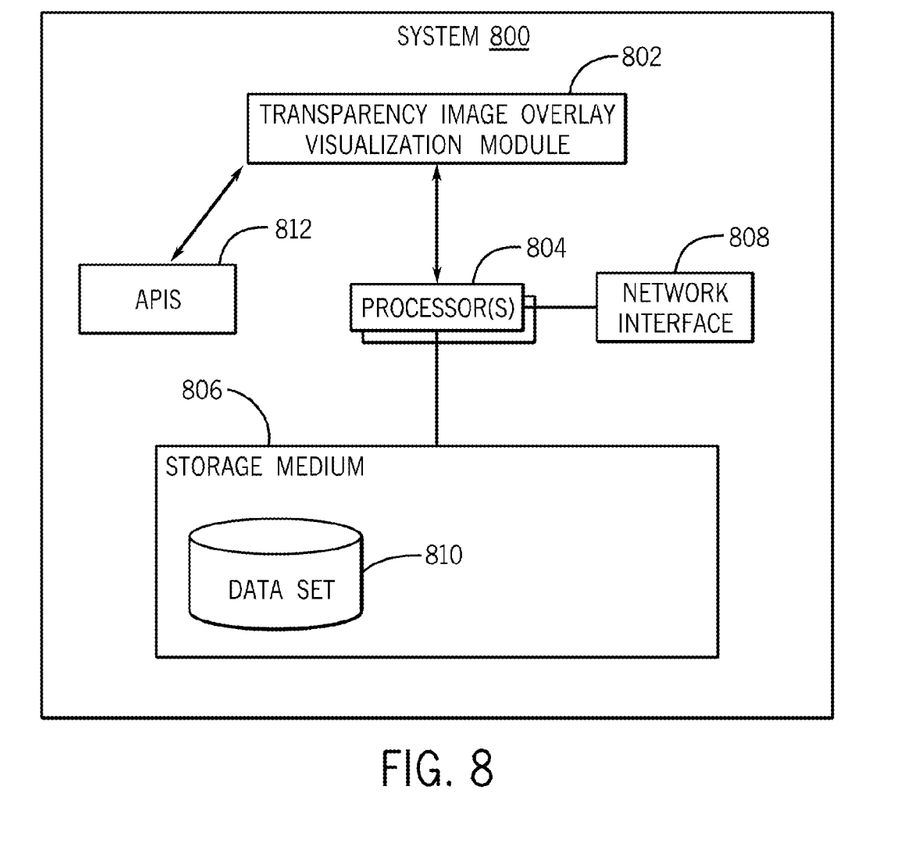
FIG. 8 is a block diagram of an example system incorporating some implementations.

FIG. 8 is a block diagram of an example system 800 that has a transparency image overlay visualization module 802 according to some implementations. The transparency image overlay visualization module 802 can perform various tasks discussed above, including those depicted in connection with FIG. 5 or 6 or the tasks performed by the pseudocode shown above.

The transparency image overlay visualization module 802 can be implemented as machine-readable instructions executable on one or multiple processors 804. The processor(s) 804 can be connected to a storage medium (or storage media) 806 and to a network interface 808. A processor can include a microprocessor, a micro controller, a processor module or subsystem, a programmable integrated circuit, a programmable gate array or another control or computing device. The storage medium 806 can store a data set 810 that has been received by the system 800, where the data set 810 can include various data records that contain attribute values according to some implementations.

The system 800 also includes various application programming interfaces (APIs) 812. Different ones of the APIs can be used for different geographic maps, to allow transparency images generated by the transparency image overlay visualization module 802 to be overlaid onto the respective geographic map using the appropriate API.

The storage medium (or storage media) 806 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving, by a computer, data records containing corresponding values of a sentiment attribute, where the data records are associated with location information, and the values of the sentiment attribute represent respective sentiments expressed by users and are based on user feedback with respect to a product or service provided by an enterprise;

generating, by the computer, hierarchical levels of transparency images, where each of the transparency images includes corresponding pixels that represent the respective data records, and where the transparency images at different ones of the hierarchical levels correspond to different zoom levels of a geographic map;

overlaying, over the geographic map, at least one of the transparency images at a dynamically selected one of the hierarchical levels according to which of the zoom levels is selected by a user in zooming of the geographic map, wherein the at least one transparency image is automatically selected without user input; and assigning different visual indicators to the pixels in the at least one transparency image based on respective different values of the sentiment attribute in the data records represented by the pixels in the at least one transparency image.

2. The method of claim 1, further comprising:

recursively dividing a data space representing a collection of the data records into progressively smaller partitions corresponding to different ones of the hierarchical levels, wherein a particular one of the transparency images contains pixels representing a respective one of the partitions.

3. The method of claim 2, wherein a first one of the transparency images corresponding to a first of the hierarchical levels has a larger number of pixels than a second one of the transparency images corresponding to a second of the hierarchical levels.

4. The method of claim 1, further comprising:

in response to user selection of a different zoom level for viewing the map, overlaying, over the geographic map, a different one of the transparency images at another one of the hierarchical levels.

5. The method of claim 1, wherein a first of the hierarchical levels is associated with a first transparency image, and a second of the hierarchical levels is associated with second transparency images that correspond to partitions of a space represented by the first transparency image.

6. The method of claim 1, further comprising:

synchronizing selected ones of the transparency images with a displayed portion of the geographic map using geographic coordinates assigned to the transparency images.

7. The method of claim 1, wherein assigning the different visual indicators comprises assigning different colors to the pixels in the at least one transparency image according to different values of the sentiment attribute.

8. The method of claim 1, further comprising:

providing plural application programming interfaces (APIs) for different corresponding geographic maps; and using one of the APIs to overlay the selected at least one transparency image over the geographic map.

9. An article comprising at least one non-transitory machine-readable storage medium storing instructions that upon execution cause a system to:

recursively divide a data space containing data records into progressively smaller partitions corresponding to different hierarchical levels, where the data records contain corresponding values of a sentiment attribute and are associated with location information, and the values of the sentiment attribute represent respective sentiments expressed by users and are based on user feedback with respect to a product or service provided by an enterprise;

generate transparency images containing respective groups of pixels representing data records in the data space and the smaller partitions, wherein the transparency images are at respective hierarchical levels of the hierarchical levels that correspond to different zoom levels of a geographic map;

overlay, over the geographic map, at least one of the transparency images at a dynamically-selected one of the hierarchical levels according to which of a plurality of zoom levels is selected by a user in zooming of the geographic map, wherein the at least one transparency image is automatically selected without user input; and assign different visual indicators to the pixels in the at least one transparency image based on respective different values of the sentiment attribute in the data records represented by the pixels in the at least one transparency image.

10. The article of claim 9, wherein assigning the different visual indicators comprises assigning different colors to the pixels in the at least one transparency image according to respective different values of the sentiment attribute.

11. The article of claim 10, wherein a first of the hierarchical levels is associated with a first transparency image, and a second of the hierarchical levels is associated with second transparency images that correspond to partitions of a space represented by the first transparency image.

12. The article of claim 9, wherein the instructions upon execution cause the system to further:

synchronize selected ones of the transparency images with a displayed portion of the geographic map using geographic coordinates assigned to the transparency images.

13. A system comprising:

at least one processor; and a non-transitory machine-readable storage medium storing instructions that are executable on the at least one processor to:

receive data records containing corresponding values of a sentiment attribute and associated with location information, wherein the values of the sentiment attribute represent respective sentiments expressed by users and are based on user feedback with respect to a product or service provided by an enterprise;

generate hierarchical levels of transparency images, where each of the transparency images includes corresponding pixels that represent the respective data records, and where the transparency images at the hierarchical levels correspond to different zoom levels of a geographic map;

overlay, over the geographic map, at least one of the transparency images at a dynamically-selected one of the hierarchical levels according to which of the zoom levels is selected by a user in zooming of the geographic map, wherein the at least one transparency image is automatically selected without user input; and assign different visual indicators to the pixels in the at least one transparency image based on respective different values of the sentiment attribute in the data records represented by the pixels in the at least one transparency image.

14. The system of claim 13, wherein the instructions are executable on the at least one processor to further:

recursively divide a data space representing a collection of the data records into progressively smaller partitions corresponding to different ones of the hierarchical levels, wherein a particular one of the transparency images contains pixels representing a respective one of the partitions.

15. The system of claim 13, wherein the different visual indicators are different colors assigned to the pixels in the at least one transparency image according to different values of the sentiment attribute.

* * * * *